Patented June 25, 1940

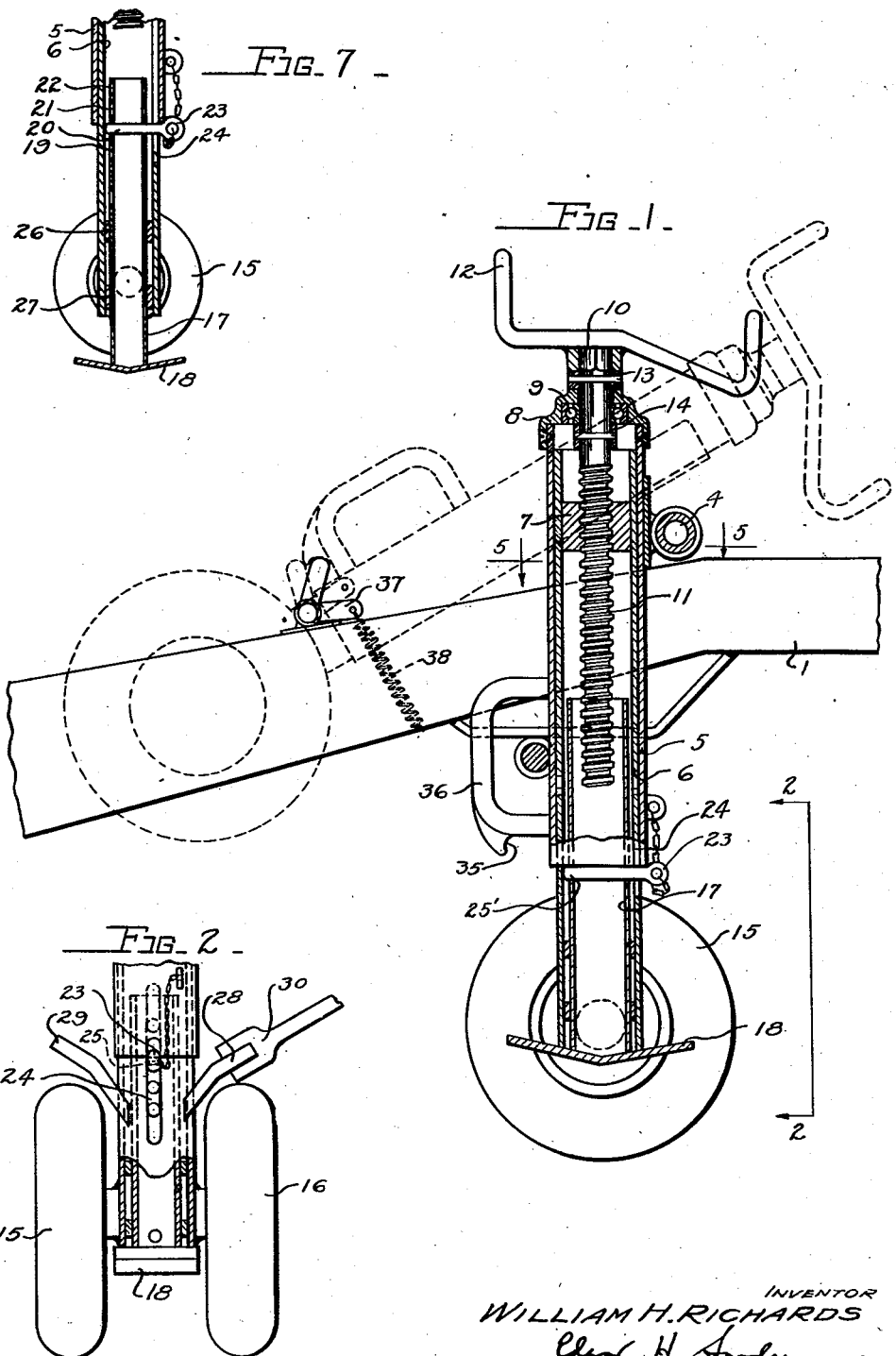

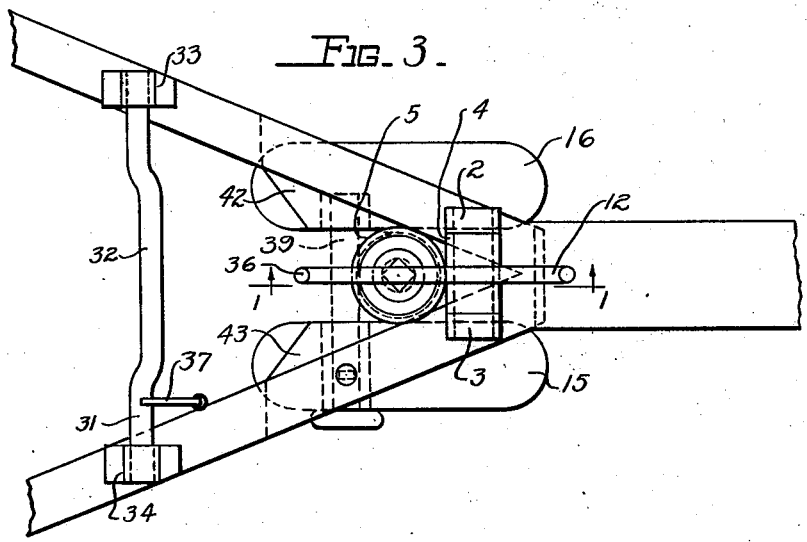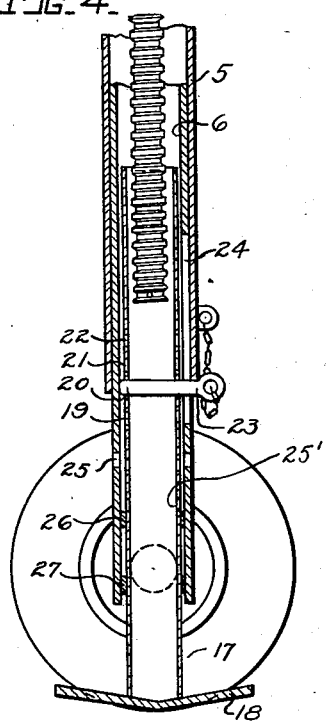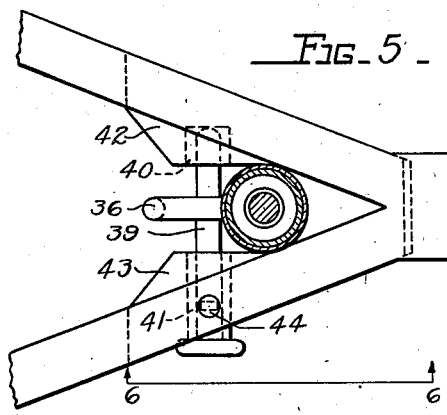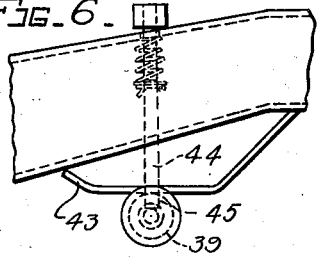

2,205,436

UNITED STATES PATENT OFFICE 2,205,436

VEHICLE SUPPORT ASSEMBLY

William H. Richards, Dayton, Ohio

Application August 21, 1939, Serial No. 291,202

10 Claims. (Cl. 254—86)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an assembly for supporting a portion of a vehicle and particularly the front end of a two-wheeled trailer when the trailer has been detached from the towing means or prime mover.

It is an object of this invention to provide a vehicle support assembly which is tiltable to an inoperative out-of-the-way position when the vehicle is being towed and which may be readily moved to and held in an operative position.

It is a further object of this invention to provide in the assembly separate and independently operable wheel and non-rotatable support means for selectively supporting the front end of a vehicle.

It is a further object of this invention to provide a supporting wheel means movable to supporting position when it is desired to maneuver the vehicle by hand.

It is another object of this invention to provide the vehicle with a rigid support selectively movable to operative position to eliminate bouncing of the vehicle, a condition which occurs when a person moves in a vehicle supported entirely by pneumatic tires.

It is a further object of this invention to provide means for readily adjusting the supporting parts of the assembly so that the vehicle may be readily leveled.

Other objects of invention will become apparent from the following description taken in connection with the accompanying drawings.

In the drawings:

Fig. 1 is a cross-sectional view taken generally along the lines 1—1 of Fig. 3, showing the vehicle support assembly in operative position in full lines and in tilted, inoperative position in dotted lines.

Fig. 2 is a front elevational view taken generally along the lines 2—2 of Fig. 1, showing the non-rotatable support member in retracted position, the weight of the front end of the vehicle being carried by the wheel means.

Fig. 3 is a top plan view of Fig. 1.

Fig. 4 is a cross-sectional view of the supporting members showing the non-rotating support in lowered position.

Fig. 5 is a cross-sectional view taken generally along the lines 5—5 of Fig. 1.

Fig. 6 is a detail elevational view taken from a vertical plane established by the lines 6—6 of Fig. 5.

Fig. 7 is a view similar to Fig. 4, showing the wheels raised, the weight being carried by the non-rotatable member.

Referring to the drawings, 1 refers generally to the chassis or frame of the vehicle having integral therewith bearings 2 and 3 for receiving for rotative movement a bearing 4 integrally united with a member 5, which, for convenience of manufacture and assembly, is made in the form of a tube. Slidably mounted in tube 5 is a second tube 6 having rigidly connected thereto at the upper end thereof an internally threaded collar 7. Wheels 15 and 16 are rotatably mounted for rolling motion by means of suitable bearings on tube 6 adjacent the lower end thereof. Obviously, a single wheel could be provided if desired. Detachably connected to the upper end of tube 5 is a bearing housing 8 containing a bearing 9 for rotatably mounting a member 10 having a screw threaded portion 11 and a handle portion 12.

Thrust collars 13 and 14, suitably fastened to member 10, prevent relative longitudinal movement between member 10 and tube 5. Rotation of member 10 causes tube 6 to slide relative to tube 5 to raise or lower the wheels 15 and 16.

Supporting tube 17, freely slidably mounted in tube 6, has a foot portion 18 adapted to rest upon the ground, to take the weight of the vehicle off the tires and provide a rigid, non-rotatable or non-rolling support for the front end of the trailer. The rigid support is desirable and at times necessary to prevent bouncing of the trailer when the occupants thereof move therein. Tube 17 is provided with a plurality of openings 19, 20, 21, and 22 for receiving a pin 23, upon which tube 5 is adapted to abut to transmit the weight of the vehicle directly from tube 5 to tube 17 and foot 18.

Tube 6 is provided with an extended slot 24, permitting upward sliding movement of the tube, when pin 23 is positioned to transmit the weight from tube 5 to tube 17 (Fig. 4), to raise the wheels and allow the entire weight of the front end of the vehicle to be carried by tube 17. Tube 6 is also provided with a suitable pin receiving opening 25 for holding tube 17 in raised inoperative position when pin 23 extends through 25 and 25'.

Bearings 26 and 27 may be provided between tubes 17 and 6 to provide a snug sliding fit. Tube 6 may also be provided with handles 28 and 29 adapted to be engaged by a tool 30 for steering wheels 15 and 16 when maneuvering the trailer by hand.

When the vehicle is attached to a prime mover, the wheel assembly is tilted to inoperative position, as shown in dotted lines in Fig. 1, and held in that position by means of a latch in the form of a rod 31, rotatably mounted in bearings 33 and 34 and having an offset portion 32 adapted to engage a notched portion 35 on handle 36, which, in turn, is integral with tube 5. A coil spring 38, attached at one end to the frame and at the other end to member 37, integral with latch 31, urges the latch to operative holding position.

As shown in Fig. 5, a pin 39 holds tube 5 in a vertical position against frame 1. Pin 39 is receivable in suitable bearings 40 and 41 carried by plates 42 and 43, respectively, which, in turn, are rigidly connected to frame 1.

A spring pressed locking pin 44 engages a notch 45 in pin 39 to hold it in operative position.

The operation of the device is as follows: With the vehicle support assembly in an inoperative position, as shown in dotted lines in Fig. 1, latch 31 is rotated counterclockwise, releasing the assembly and permitting it to be rotated about bearings 2, 3, and 4 to the position shown in solid lines in Fig. 1. Pin 39 is then positioned in back of tube 5 to hold the assembly in a substantially vertical position.

Handle 12 is rotated to move tube 6 downward relative to tube 5 until wheels 15 and 16 engage the ground. The vehicle is then disconnected from the prime mover and may be maneuvered by hand, if desired, to a final location, guiding being effected manually by tool 30 engaging one of the handles 28 or 29 integral with tube 6. The trailer may be leveled by further rotation of handle 12.

If it is desired to rigidly support the front end of the vehicle, pin 23 is withdrawn from openings 25 and 25', allowing foot 18 to drop from the raised position shown in Fig. 2 to the position shown in Fig. 4. Pin 23 is then reinserted in an opening in tube 17, such as 20 (Fig. 4), with tube 5 resting against the pin. Pin 23 is receivable in slot 24 in tube 6, permitting tube 6 to be drawn upward, raising wheels 15 and 16 from the ground and transferring the weight of the vehicle from the tires and wheels to the tube 5.

Although a single preferred embodiment of the invention has been described, it is to be understood that changes and modifications may be made in the device without departing from the spirit and substance of invention. Various modifications and changes may be made by those skilled in the art without departing from the inventive concept, and it is intended that the invention be limited only by the scope of the appended claims.

I claim:

1. A support assembly for a vehicle comprising relatively movable members, one of which is attached to said vehicle and the other of which has mounted thereon a support engaging wheel, means for causing relative movement between said members, and a non-rotatable supporting member adjustably associated with said one member, whereby said wheel-carrying member and said non-rotatable supporting member are selectively adjustable to vehicle supporting position.

2. A device as recited in claim 1 and further characterized by having said one member retractably attached to said vehicle for movement to and from an out-of-the-way position.

3. A support assembly for a vehicle comprising relatively movable members, one of which is attached to said vehicle and the other of which has mounted thereon a support engaging wheel, means for causing relative movement between said members, a non-rotatable supporting member adjustably carried by said wheel carrying member to and from support engaging position, means for transmitting the load from said attached member to said non-rotating member, said members being so constructed and arranged that the vehicle weight is transferrable to the non-rotating member by retraction of said wheel carrying member.

4. A support assembly for a vehicle comprising relatively movable members, one of which is tiltably mounted on said vehicle, means for causing relative movement of said members, a vehicle supporting wheel carried by the other of said movable members, and a non-rotatable member carried by one of said members with capacity for relative movement with respect thereto, whereby said wheel carrying member and said non-rotatable member are selectively movable into position to support said vehicle.

5. In combination with a two-wheeled trailer having a frame, a front support assembly mounted on said frame to tilt from and to an inoperative position, means for holding said assembly in its inoperative position, means for holding said assembly in operative position, said assembly comprising vehicle supporting wheel means and non-rotatable supporting means, each of which means is selectively adjustable to support the front end of said trailer.

6. In combination with a two-wheeled trailer having a frame, a member mounted on said frame and movable to and from an inoperative position, means for holding said member in operative position, means for holding said member in inoperative position, a wheel carrying member slidably mounted on said first-mentioned member, means for adjusting said wheel carrying member relative to said first-named member and for holding said members in adjusted position, and a non-rotatable supporting member adjustably mounted on said wheel carrying member whereby the front end of said trailer may be selectively supported on said wheel carrying member or on said non-rotatable supporting member.

7. In combination with a vehicle, a support assembly movable to and from an inoperative position, means for holding said assembly in its operative and inoperative positions, said assembly comprising adjustable wheel means and an independently adjustable non-rotatable supporting means whereby a portion of said vehicle may be selectively supported by said wheel means or by said non-rotatable supporting means.

8. A support assembly for a vehicle comprising relatively movable members, one of which is attached to said vehicle and the other of which has mounted thereon a support engaging wheel, means for causing relative movement between said members, and a non-rolling supporting member carried by one of said members and longitudinally adjustable with respect thereto whereby said vehicle may be selectively supported by said wheel or by said non-rolling supporting member.

9. A device as recited in claim 8 and further characterized by said supporting member being provided with pin-receiving openings and said other member being provided with a pin-receiving slot, and a pin receivable in said pin-receiving openings and slot and adapted to engage said vehicle-attached-member, said slot permitting retraction of said other member.

10. A device as recited in claim 8 and further characterized by said assembly being provided with a manual steering device.

WILLIAM H. RICHARDS.